Feb. 17, 1942.   J. A. BOWER   2,273,015
METHOD OF MAKING CAST CERAMIC FLATWARE
Filed Feb. 27, 1939   2 Sheets-Sheet 1
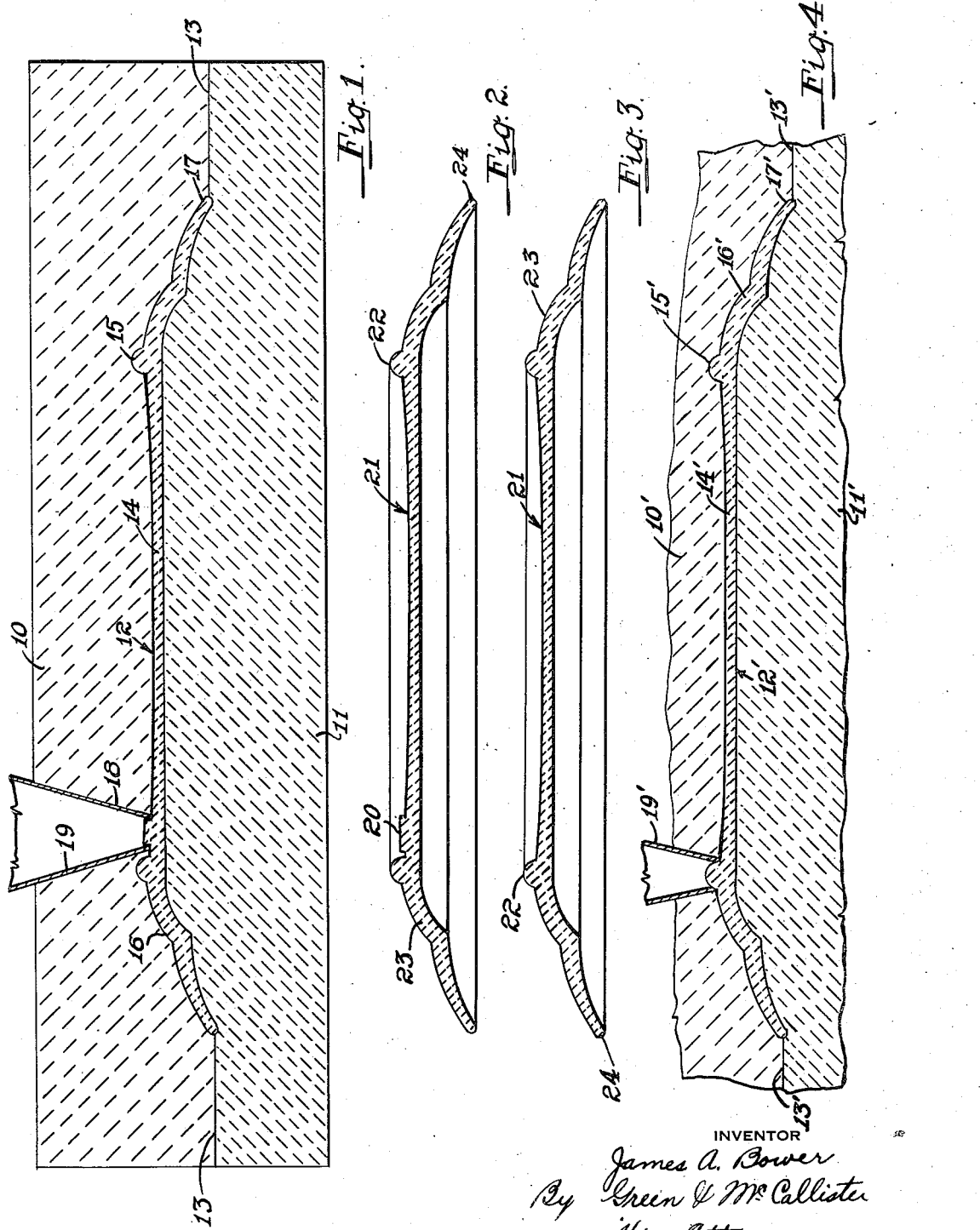
INVENTOR
James A. Bower
By Green & McCallister
His Attorneys Feb. 17, 1942. J. A. BOWER 2,273,015
METHOD OF MAKING CAST CERAMIC FLATWARE
Filed Feb. 27, 1939 2 Sheets-Sheet 2

INVENTOR
James A. Bower
By Green & McCallister
His Attorneys.

Patented Feb. 17, 1942

2,273,015

UNITED STATES PATENT OFFICE 2,273,015

METHOD OF MAKING CAST CERAMIC FLATWARE

James A. Bower, Chester, W. Va., assignor to The Taylor, Smith & Taylor Company, a corporation of West Virginia Application February 27, 1939, Serial No. 258,746

9 Claims. (Cl. 25—156)

The present invention relates to the ceramic art and more particularly is concerned with the production of flatware by a casting procedure as well as to the cast flatware so produced.

For the purposes of the present application the term flatware is to be understood as including all ceramic articles except those which have a mouth or opening smaller than any portion of the body of the article and hence from which a core cannot be removed. Flatware accordingly includes such articles as plates, saucers, lugged and unlugged cups, bowls, nappies, platters and pressed ware. It specifically excludes those items of hollow ware from which a core cannot be removed; e. g., sugar bowls, cream pitchers, teapots, salts and peppers and some casseroles, gravy boats, etc.

The hollow ware articles are usually produced by the conventional one-sided casting process which is incapable of producing articles of non-uniform thickness. Most of the articles included by the term flatware as above defined are produced by jiggering; in some cases pressing is resorted to. Lugs or handles are produced separately and then attached prior to firing. As jiggering is less expensive than casting the practice has been to produce by jiggering all articles capable of being so made.

Jiggering and casting procedures as practiced in the ceramic industry are both well known and are both widely utilized. In the jiggering procedure, a suitable clay is mixed with water to a flowable consistency, and after thorough agitation is passed through a filter press. This produces filter cakes which are of greatly reduced water content and of the general consistency of modelling clay; i. e., are plastic. These filter cakes are stacked and allowed to age, the aging process resulting in a definite improvement in the quality and nature of the clay for some reason which is not well understood but which probably is related to air content or possibly bacterial action.

Subsequent to the aging procedure, the clay is put through a pug mill which extrudes it in the form of a continuous bar or column which is cut off at intervals by a wire or the like to produce a so-called pug. These pugs are then conveyed to the jiggering department where portions of the pugs are deposited one at a time by hand upon a mold and flattened into a pancake-like form by a suitable tool, called a batt, wielded by an operator. Then a forming tool (jigger) is lowered into contact with the clay on the mold and the mold rapidly rotated, thus forming the bottom or outside of the plate, dish, or the like. Then the crude article and the mold, which latter is so contoured as to produce the desired design, pattern, etc. on the top or inside of the plate or dish, are removed and placed in a drying zone for a period of time and at a sufficient temperature to cause the jiggered clay article to acquire a "leather-like" hardness, after which it is fired in a kiln and subsequently glazed, decorated, or the like and again fired to produce the finished article.

The production of certain ceramic articles by pressing involves individual manual operations for each article or piece of ware. In hand pressing procedures the article or piece of ware cannot be provided with a foot nor can it have portions of different thickness than other portions. These limitations on hand pressing operations greatly restrict the value and use of such procedure.

Such articles of ceramic ware which can not be made either by the jiggering or by the pressing procedure are made by casting. In casting ceramic articles as now practiced, a mold is prepared of plaster of Paris or other suitable absorbent material which is dehumidified and which has an inner surface complementary to the outer surface to be formed on the cast article. Then liquid slip of the correct specific gravity (approximately 1.74 being preferred) and viscosity is poured into the mold sufficient to fill the same. This liquid slip may be made up by blunging the filter cakes above described with water to reduce the consistency of such to that of a paint. The liquid slip is allowed to remain in the mold for a definite period of time dictated by judgment and experience and during this interval the mold absorbs moisture from that part of the liquid slip in contact with the mold wall to form a more viscous, heavy layer or casting which adheres to the mold wall. After the allotted time the excess or still liquid slip is poured out or removed, and this leaves within the mold a rather soft casting adhering to the mold wall.

This mold and casting are then placed in a drying zone for such time and at such temperature as to cause the casting to acquire a "leather-hard" condition and to shrink away from the mold surfaces, at which time the casting is capable of existing independently of the mold if properly handled. Therefore, at such time the mold is removed, it being generally made of two portions which can be opened and taken apart, and this produces a so-called "green" casting. At such time also certain manual operations, such as trimming, smoothing, etc., are required in order to remove mold marks and excess clay which adheres to certain portions of the casting and forms undesirable irregularities. A skilled workman removes these with a special tool. Then the article is fired, glazed, and/or decorated and re-fired, and is then in completed condition.

While the jiggering procedure is comparatively inexpensive and reasonably satisfactory, it does have certain defects and limitations which those working in this field realize. For example, jiggering can not be utilized in connection with articles which are not round or symmetrical as will be clearly appreciated due to the nature of the jiggering operation. Jiggered articles also always contain air with the result that an appreciable percentage of finished ware is defective either in strength or in appearance—in strength because of excess porosity and in appearance because of air holes. Again, it is only possible to jigger articles which are to be embossed or provided with an intaglio pattern on one side of the article; i. e., on that side which becomes the upper or top side of the finished ware. Both jiggering and pressing introduce strains into the ceramic materials with the result that many articles subsequently warp or become distorted or uneven upon standing or when fired or subjected to other procedures or treatments. Pinholes, cracks, crevices, etc. are also likely to result in the finished article when made by conventional procedures.

Similarly, existing casting procedures have recognized defects and limitations. For example, no article of ceramic ware can be cast from both sides or with a non-uniform thickness and no such article can be cast which is to be provided with an embossed or intaglio pattern on both surfaces. Such attempts as have been made to improve casting procedure have introduced new disadvantages and have not resulted beneficially with respect to procedure, product or cost. So far as I am aware the casting procedure heretofore described is the only one in commercial use. Successful casting depends upon and is limited by the ability to produce slip of proper specific gravity and viscosity uniformly and consistently. Moreover, the casting procedure as now practiced is comparatively expensive as it involves a considerable number of manual operations which can only be carried out by skilled artisans. This situation has, accordingly, placed the ceramic industries in a somewhat undesirable position as represents the production of dinnerware, for example. While it has long been sought to produce ceramic flatware by casting, no practicable or successful results have been produced heretofore so far as I am aware.

It is, accordingly, one of the objects of the present invention to make it possible to cast ceramic flatware, particularly thin articles, in a simple, efficient, inexpensive manner both of semi-vitreous and vitrified nature which have substantial freedom from any tendency to warp or distort.

Another object of the invention is to cast articles of ceramic ware which have a non-uniform thickness, thus overcoming one of the greatest obstacles to the casting of flatware.

Another object of the invention resides in the production of ceramic flatware by a casting procedure wherein the flatware can be provided with an embossed or intaglio pattern on either or both surfaces.

An additional object of the invention resides in the production of ceramic flatware by a casting procedure wherein the ware is of increased density, uniformity, and strength due to the elimination of entrapped or occluded air within the casting and wherein the articles are free from stress, pinholes, cracks, etc.

Another object of the invention resides in the production of ceramic flatware by a casting procedure which is substantially as inexpensive as the conventional jiggering procedure and yet which provides manifold advantages which the jiggering procedure lacks.

A still further object of the invention resides in the production of ceramic flatware by a casting procedure in a set of molds and wherein pouring takes place at or adjacent that portion of the mold cavity of such set of molds which has the greatest thickness or largest section.

A still further object of the invention resides in casting ceramic flatware without introducing air into the casting.

Other and further objects and advantages will be understood by those skilled in this art or will be apparent or pointed out hereinafter.

In the accompanying drawings, Figure 1 is a sectional view through a set of molds utilized in carrying out the present invention;

Fig. 2 is a sectional view of the initial casting made in the molds of Fig. 1;

Fig. 3 is a view similar to Fig. 2 of the completed article;

Fig. 4 is a view similar to Fig. 1 of a modified casting arrangement or assembly.

Like numerals designate corresponding parts throughout the various views.

Figure 5:
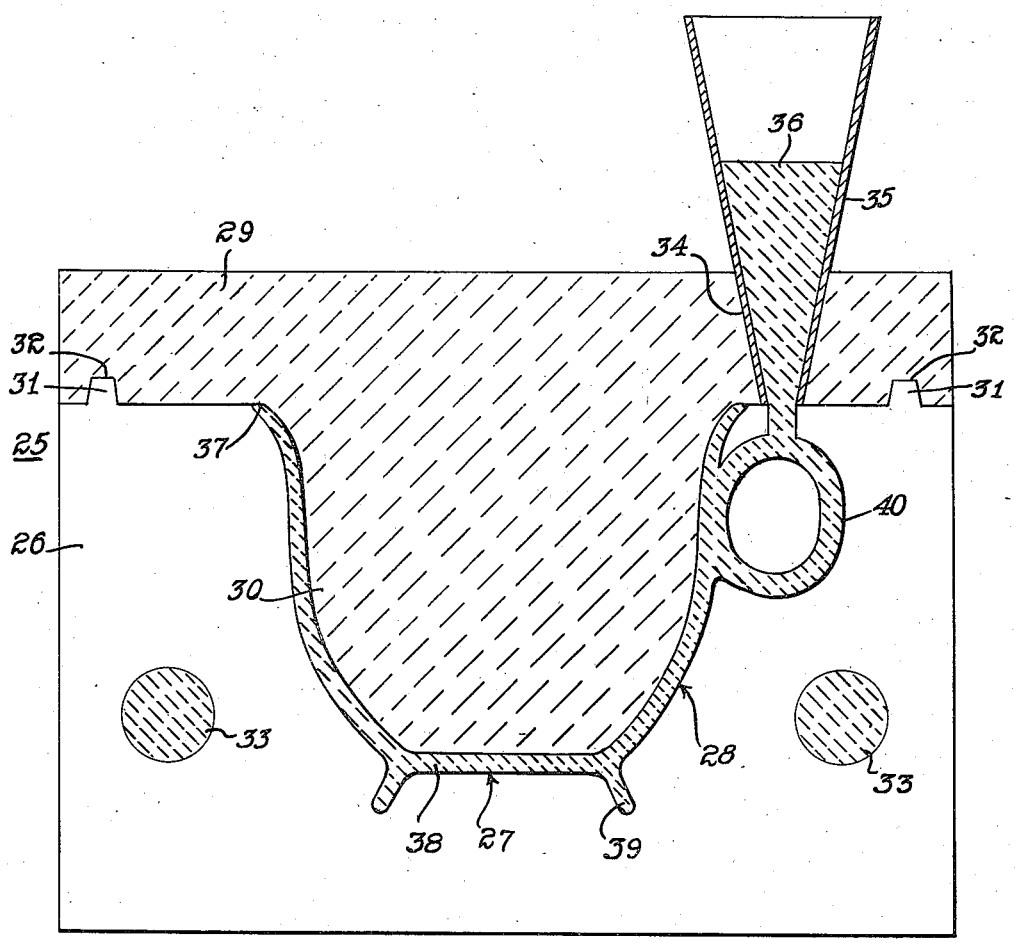
Fig. 5 illustrates the formation of a handled cup in accordance with this invention.

In carrying out my present invention I first produce a suitable liquid slip from air floated or blunged and screened ball clays plus the other usual materials and maintain the same under agitation so that a uniform slip will be available for my new casting procedure. In connection with the production of the slip and the maintenance of the same under agitation as just mentioned, it is also advantageous to remove as much entrapped or occluded air as can be accomplished by subjecting the slip to a vacuum. I prefer a vacuum equal to about 27 inches of mercury but the vacuum should not be such as to occasion "boiling." I have found that this materially aids in the production of high grade cast flatware and not only minimizes the air content of the slip but overcomes the inherent tendency of the agitation to introduce air into the slip. In connection with these preliminary steps, I may, of course, carry on those steps which are often utilized in connection with the employment of liquid slip for pottery making such as the removal of oversize particles from the liquid slip and the magnetic separation therefrom of certain metallic contaminations such as iron oxides.

It is, however, to be understood that my procedure entirely eliminates the usual filter pressing operation above described since, as already mentioned, I may use air-floated clays entirely or I may use a ball clay which has been blunged and screened separately and then the other materials added in the blunger to form the proper casting slip. It will also be understood that I have entirely eliminated the pugging of the clay and that the handling of the slip can be carried out very simply, effectively, and economically by pumping the same through pipe lines, thus also eliminating the usual handling and trucking of the pugged clay to the various plant locations where it is to be used.

While the invention is capable of being carried out in an automatic or semi-automatic manner, for the purposes of brevity and convenience I will describe the invention in the form in which it can be carried out by hand, thus demonstrating its true procedural nature. I assemble one or more sets of dehumidified molds, one set of which has been illustrated in Fig. 1. In this figure the set of molds consists of an upper mold part 10 and a lower mold part 11. These two mold parts are so configured as to produce between them a mold cavity 12 which is of slightly greater size than and the same shape as the ceramic article to be produced to allow for shrinkage in firing. This mold cavity 12 occupies the central innermost portions of the mold parts 10 and 11, and, as will be understood, the inner peripheral portions of the molds abut and seal off the mold cavity as indicated by the parting lines 13. Suitable means may be provided for ensuring accurate registration of the molds.

Each mold part 10 and 11 is composed of a plaster of Paris or other suitable composition which, prior to use, has been manitained under such conditions of temperature and humidity as to produce a high degree of moisture attraction in the composition. It is not usually necessary to maintain the mold parts in a bone-dry condition because the molds are equally effective in absorbing moisture when their moisture content is low, so long as the percentage of moisture is materially less than that of the slip. As will be appreciated from Fig. 1, the mold cavity includes a central portion 14 which is, in the particular instance shown, disk-shaped and gradually decreasing in thickness toward the center. Circumferentially bounding the upper (in Fig. 1) surface of cavity portion 14 is an inverted U-shaped mold cavity portion 15 which is adapted to form the foot of the ceramic article. Beyond portion 15 the mold cavity has an arcuate radially tapering portion 16 of annular nature which is adapted to form the bowl of the ceramic article. Beyond portion 16 the mold cavity again curves and tapers until it terminates in the reduced portion 17 which is adapted to form the rim of the ceramic article and the portion adjacent the rim. It is to be understood that the mold cavity described as well as the article hereinafter specifically referred to is merely one example of a ceramic article which can be produced in accordance with the present invention and is therefore to be considered purely as exemplary and not in any sense as restrictive or limitative.

Referring again to the set of molds of Fig. 1, it will be clear that a pouring hole 18 is provided in the upper mold part 10. This opening preferably tapers for the accommodation of a funnel 19, this funnel closely fitting the hole 18 so that there is no air space between and no possibility of causing or permitting slip to get out of the mold cavity. In addition, the funnel is preferably made of a non-porous material such as copper or other metal in order that it may be readily flushed or washed and so that the slip will not cast thereon. While it will be appreciated that the mold cavity itself is normally full of air when empty, nevertheless this is appropriately taken into account and is therefore no disadvantage for reasons which will become apparent hereinafter.

The possibility of this air in the mold cavity causing interference with the pouring operation may be minimized or eliminated by carrying out the entire pouring operation in a vacuum, and it is to be understood that this forms a definite but an optional part of the present invention because at least under some conditions it is not essential to pour the slip under a reduced atmospheric pressure. In pouring liquid slip under ordinary atmospheric pressure conditions I have found that the air in the mold cavity is displaced rapidly and effectively by the incoming liquid slip and that there is substantially no pick-up of air by the slip, the air in the mold cavity passing into the molds themselves due to the comparative porosity of these molds. As hereinafter explained pouring may take place in a closed system and/or under increased pressure. As will be hereinafter more fully explained, the pouring or filling operation is preferably relatively slow in the beginning and relatively fast thereafter. For convenience, this will be hereinafter designated as a slow-fast fill, the importance and significance of which will be pointed out.

In pouring the liquid slip into the mold cavity, it is pointed out and will be noted from the drawings that the pouring point is at or near the portion of the cavity which produces the thickest portion of the ceramic article and flow of slip proceeds in a thick-thin direction, therefore, relative to mold cavity dimensions. This I have found to be of importance. Pouring liquid slip in such manner prevents any interference with the complete filling of the cavity, thus eliminating the possibility of a portion of the slip in a narrower part of the cavity solidifying and obstructing the path of the incoming slip. For example, experiments which I have carried out wherein liquid slip has been poured at the center of the mold cavity have demonstrated that invariably liquid slip will harden at one or more spots within the mold cavity portion 14, and this absolutely prevents the production of a satisfactory article. The point of pouring can be either adjacent the portion 15 of the mold cavity or may be at portion 15' as indicated in Fig. 4 wherein funnel 19' discharges slip directly to mold cavity portion 15'. I prefer, however, to pour at approximately the point indicated in Fig. 1 as I have found that under average conditions this produces the best casting with substantially no imperfect articles. The pouring hole should be small and thus I can produce a casting with only a very small pour spot 20 to be later removed and finished.

The pouring operation is continued until the mold cavity is filled and until sufficient excess accumulates in the funnel to produce only a small pour spot when the excess is utilized due to elimination of water from the slip during the casting period. For example, I have determined that there is a weight shrinkage of about 48% involved and that this weight shrinkage is accompanied by a volume shrinkage of about 31%. These figures depend upon the specific gravity of the slip and the nature of the materials. I then transfer the slip-filled set of molds into a drying zone and the liquid slip is allowed to remain in the molds for a predetermined length of time which is determined by experience and judgment depending upon the size of the mold, the size of the mold cavity, the percentage of moisture in the molds and slip, and other factors such as will be appreciated by those versed in this field. The action which takes place when the slip is poured into the mold cavity is well known and needs no detailed description here. Briefly, the molds attract moisture from the slip and this moisture is later removed from the molds when the molds are reconditioned. Usually a mold must be dried before each use thereof. It will also be understood that the molds are of sufficient volumetric capacity, insofar as their moisture absorbing characteristics are concerned, to hold the moisture extracted from a charge of slip and that these molds are subsequently dehumidified before they are used again. The pouring or filling operation usually requires about 5-20 seconds and casting is complete in about 20 minutes.

Under some special circumstances I have found that the action can be improved or controlled by making one mold part of a different density or of different moisture content than the other. The advantages which these variations of my procedure will produce will be understood but such is particularly useful in connection with ceramic articles of odd or peculiar shapes or wherein certain portions of the articles are of much greater thickness than other portions, and thus it is not necessary to prolong the drying operation for such excess time as would normally be necessary to produce the required amount of moisture removal from the thickest portion of the casting. Hence, uniform drying and residual moisture content can be produced in articles of difficult or unusual shape, size, etc.

In connection with filling the molds with liquid slip, I also wish to point out that in prior commercial casting procedures excess slip is always poured greatly in excess of actual requirements. This not only represents an uneconomic utilization of material and is undesirable as a result but also means that subsequent manual trimming, smoothing, etc. operations are excessive. In connection with my new casting procedure, I complete the pouring operation under close observation and control, and where an appreciable excess is noted this is immediately removed by suction as by dipping the end of a suction hose or nozzle into the slip until the level is lowered to minimize the size of the pouring spot. Preferably, I pour only a slight excess of slip, as will be understood from what has preceded. After the drying operation above referred to, the top mold part 10 is removed and the casting has shrunk away slightly therefrom so that the mold part may be removed without damaging the surface of the casting. At such time I also prefer to flush out the funnel 19 so that it will be clean and ready for a subsequent use.

The matter of mold release also forms an important part of my invention as care should be taken in removing the top mold lest the casting stick thereto and be ruined. I have discovered that by dusting the molds before they are filled with slip a positive mold release is secured and that by suitably proportioning the amount of dusting of the mold surfaces I can control the mold release so as to enable either mold part to be removed first as desired. As dusting material I may employ talc, flint, pyrophyllite or plaster of Paris in finely divided condition. Mold oil may also be used and is intended to be within the scope of the term "dusting."

I make a suspension of any of the above or other suitable dusting materials usually in water and spray the same on the inner mold surfaces which define the mold cavity prior to filling such cavity with slip. The amount of dusting material used is not sufficient to clog the pores of the mold surfaces or to reduce or slow down their absorptive properties appreciably but is enough to prevent sticking of slip or casting thereto. By spraying somewhat more material on the upper mold an upper mold release and control are produced and this I have found preferable although it is within the scope hereof to spray more material on the lower mold where a lower mold release is required as in connection with a modification of the present invention which is set forth hereinafter.

The casting in its condition at this time is comparatively soft and can not be successfully handled without deformation; therefore, I allow the casting to remain on the bottom mold part 11 for an additional period of time and until the casting assumes a condition which is termed "leather-hard", this term being one commonly used in this art to designate such a casting condition in connection with the casting of hollow ware as above described. When the casting acquires the "leather-hard" condition it is then removed from the bottom mold and can be successfully handled to a moderate extent without suffering damage or deformation. The pouring spot which is indicated by the numeral 20 in Fig. 2 has been removed while the casting is still on the bottom mold and while this is a hand operation the same may be accomplished automatically or semi-automatically as will be pointed out hereinafter. There is unavoidably left a slight telltale mark or disfiguration on the article which is distinctive but unobjectionable. It invariably denotes a cast article.

Preferably, the pouring spot 20 of the cast flatware article 21 is removed before the casting is removed from the bottom mold as just stated since this reduces the possibility of injury to the casting, but under other conditions these steps may be reversed without disadvantage. It will likewise be appreciated from Figs. 2 and 3 that the plate 21 has a foot 22, ball 23, and a rim 24, and that the various parts have different thicknesses.

Having removed the casting from the mold, the molds are subjected to the necessary dehumidification and/or cleaning and are then ready to be utilized for another casting in another cycle of operations. The casting may now be finished in any suitable manner, depending upon its specific nature or the requirements of any given order. In producing semi-vitreous ware, ordinarily the casting is fired in a kiln under the usual conditions to produce a hard but dull and comparatively porous or absorbent article which is then provided with a suitable liquid glaze by dipping or spraying operations and then re-fired to produce the finished article. These steps result in the production of an article which is undecorated, so to speak, it being understood that where a pattern is to be produced on the article, this may be done in either of the conventional manners now employed; viz., by transferring a pattern from a decalcomania transfer or by hand painting, after either of which decorating operations the article is again fired. Certain variations or modifications such as are now carried on in connection with decorating processes may be resorted to without departing from my invention; e. g., underglazing, in which the decoration is placed on the ware prior to glazing and a transparent glaze is employed. It will be understood that the invention is equally applicable to ware having a vitrified body.

Referring to Fig. 5 of the drawings, the numeral 25 indicates a partible mold made of plaster of Paris or the like and maintained in a dehumidified condition, as already described in connection with mold parts 10 and 11. There are two mold parts identical with the one shown at 26 in Fig. 5, and between them they form a mold cavity 27 of the appropriate size and configuration to form the cup indicated at 28 in this figure. The mold arrangement in Fig. 5 differs, however, from that of Figs. 1 and 4 heretofore described mainly in that there is a top mold part 29 of the same material which has an extension or core 30 between which and the mold parts 26, already mentioned, the mold cavity is defined.

For the purpose of assuring accurate registration between the side mold parts 26 and the top mold part 29, the same are provided at their contacting surfaces with the cooperating projecting portions 31 and recesses 32. Likewise, to insure accurate registration at all times between the two side mold parts themselves interfitting lugs 33 are provided which line up these mold parts perfectly, the lugs being preferably hemispherical in shape. It will, of course, be understood that one side mold part is provided with lugs 33 and that the other side mold part is provided with complementarily shaped recesses.

It will be observed further from Fig. 5 that the top mold part 29 is provided with a conical opening 34 therethrough and that a copper or other non-porous funnel 35 is provided by means of which liquid slip, indicated at 36, is filled into the mold cavity and part way up the funnel, as previously set forth, after the three molds are assembled. The cup or casting indicated at 28 increases somewhat in thickness from the top or rim 37 thereof toward the base or bottom 38 and the cup is provided with an annular and somewhat flaring foot 39. The cup or casting 28 is also shown as having a lug or handle 40, but it is to be distinctly understood that my invention contemplates both lugged and unlugged cups or similar articles of ceramic ware. This lug or handle 40 is formed unitarily with the cup or ceramic article itself and thereby produces an article which is greatly improved as compared with prior lugged or handled ware in which the lug or handle is separately made and then attached to the ware. It can be observed further from Fig. 5 that where the lug or handle 40 joins the ceramic body there is a relatively large and strong casting formed and thus the area where the lug or handle joins the body is now the strongest part of the ceramic article instead of the weakest as in lugged ware made in accordance with existing practices.

In carrying out the procedure of my present invention on lugged or handled ware, liquid slip of suitable composition, viscosity and specific gravity, as explained above in connection with the casting of plates, is poured into the funnel 35 and immediately the mold cavity becomes sealed off from the atmosphere due to the presence of the slip in the funnel, as will be appreciated from Fig. 5. The air in the mold cavity is driven immediately into the mold parts and therefore no interference with the pouring operation occurs and there is no entrapment of air in the slip with the consequent disadvantages thereof, as also pointed out elsewhere in this specification. The time during which the slip is becoming converted into a casting can be readily determined or calculated, and I have discovered in this connection that I can produce a superior lugged or handled article of ceramic ware in a much shorter time than the same ware can be made by the usual procedure which involves making at least two parts and uniting them. I may, if I so desire, carry out the pouring operation under reduced pressure of the order of about 27 inches of mercury, and I have found in connection with the use of reduced pressure the vacuum should not be so nearly perfect as to cause "boiling" of the slip, which would be the case if the degree of vacuum approaches 29 inches (more or less) of mercury.

Both in connection with the production of lugged and unlugged ceramic ware, plates, etc., I may—and in some cases I prefer to—carry out the pouring operation in a closed system or under increased pressure. This can be very readily accomplished by providing funnel 19, 19' or 35 with a cover through which a tube or discharge pipe passes by means of which the liquid slip can be fed to the lower portion of the funnel. The use of a closed system prevents entrainment of air by the moving liquid slip. The use of increased pressure has the additional advantage that it forces the slip into the mold cavity at an increased rate and thus shortens the time for the filling operation. I have found that there is little or no danger that the slip will pick up air under these conditions because of its highly viscous nature. Otherwise, the procedure for making the article of Fig. 5 is the same as already described with the exception that it is specifically pointed out that pouring takes place through the handle, although this may be somewhat varied so long as pouring occurs at or adjacent the thick or the thickest part of the casting ultimately produced.

In connection with the present procedure which, for the first time, makes it possible to cast ceramic flatware successfully and efficiently, I wish to point out that in contrast to prior art methods I can produce a pattern or design either raised or depressed in either or both surfaces of the article such as the well-known embossed or intaglio type of surface or pattern. This is easily and conveniently done by building up or cutting out the appropriate portions of the surfaces of the mold parts which constitute the mold cavity defining walls. Where an embossed design or pattern is to be made, this can be readily done by cutting out the appropriate portions of the mold surfaces so that these cut out portions become filled with slip and thus serve to define raised portions of the casting. Where recessed or intaglio designs or patterns are desired in either or both surfaces of the ware, this can be accomplished by building up the appropriate mold surfaces with additional material of which the molds are composed, or when the mold cavities are initially cut or formed from the mold composition this can be taken into account at such a time. Thus I have made it possible for the art to produce what is, in effect, a new ceramic flatware article.

My present procedure results in the ability to produce a cast ceramic flatware article which is of non-uniform thickness or which varies in thickness at different points or from point to point regularly or irregularly. This is a new and unexpected result of my procedure and is a result which can not be accomplished by any previously known or practiced casting procedure. Pouring also takes place in the direction of thick to thin cavity portions as previously pointed out.

Articles produced by my present procedure are extremely uniform and homogeneous structurally and of somewhat increased density due to the elimination of entrapped air, and also for such reasons the ware herein produced is characterized by greater strength and better resistance to chipping, cracking, and breaking. Articles which are unusual can be produced due to the fact that embossed or intaglio patterns, designs, trade-marks, etc. may appear at any desired locations on any or all surfaces and due to the nature of my present invention I can also produce thinner and somewhat lighter ware without sacrificing strength, appearance, or serviceability.

Ware produced in accordance with my present invention is very much reduced in cost, is free from stress, warpage and distortion, lacks the usual pinholes, cracks, crevices, etc., and I have found that ware cast in accordance with this invention is not only much less expensive than ware cast in accordance with prior procedures, but in some cases is made as inexpensively or even somewhat more inexpensively than ordinary jiggered ware of the same size and weight.

I have mentioned above that my procedure may be carried out either manually or in an automatic or semi-automatic manner. In either of the latter cases I provide a conveyor such as a series of movable trays and travelling at an appropriate rate of speed. At the receiving end of this conveyor sets of molds are spaced thereon such as those illustrated in Fig. 1, and as these sets of molds are carried along by the conveyor, a pouring hose or nozzle, which is provided for each set or row of molds, is lowered into such position that the same register with and project into the funnels, and for a short distance thereafter these nozzles move along with the molds and discharge the required amount of liquid slip during such movement, at the completion of which the nozzles are raised and retracted, ready to fill another row of molds and so on, or a row of molds each on a tray is stopped, filled, and started, thus resulting in intermittent mold movement. Also, such liquid slip may be fed to the discharge or feed nozzles or hose by a cam-actuated displacement pump of such character as to be initially relatively slow and then relatively fast to meet the requirements of the slow-fast fill elsewhere described. In practicing the procedure in the automatic or semi-automatic manner referred to, at the time when the upper mold part is removed, this is preferably placed on the conveyor alongside the other mold parts. As the conveyor travels it may pass through the necessary or requisite drying zone above referred to, and also as set forth above, the conveyor may pass through a vacuum chamber at the time when the pouring operation occurs so as to make sure that air is eliminated as far as possible. It will be understood from the brief examples set forth that all the operations may be carried out upon a long conveyor and that suitable mechanical equipment and apparatus may be utilized to aid in effectively carrying out the process.

The slow-fast fill previously referred to in connection with pouring slip into the mold cavity may be carried out either manually or automatically. In the manual procedure pouring slip from a suitable container is so effected as first to seal off the mold cavity from the atmosphere with liquid slip and for ordinary size plates or flatware this occurs at the first drop or in a very few drops which, delivered adjacent the bottom of the funnel as they are, immediately fill the mold cavity below the funnel bottom and rise up slightly in the funnel; then, the fill is completed speedily until the entire mold cavity is full and until the level of liquid slip rises in the funnel high enough (a suitable mark may be provided) so that the proper amount of slip is supplied to produce the requisite casting plus a small pour spot after shrinkage due to removal of moisture during casting. By delivering the slip under pressure the filling time is reduced and production proportionately increased. Where such pressure is relieved after filling is complete so as to fill the mold cavity under pressure and effect casting at normal atmospheric pressure, thus further differentiating from known casting procedure in which the duration of the casting step is accompanied by the application of superatmospheric pressure.

The slow-fast fill and the pressure changes described can also be effected automatically (or semi-automatically) through a closure provided for the funnel either by gravity or by a cam-actuated piston type pump. In each case slip is fed under pressure to a tube extending to the bottom of the funnel first relatively slowly and then relatively rapidly, as already explained. The details of apparatus or its operation required for such are not specifically described and claimed herein as the same forms the basis of my co-pending application Serial No. 265,461, filed April 1, 1939.

In carrying out corroborative tests and experiments I also discovered that improper filling produces a "line" in the ware which is objectionable. This "line" is a raised ridge or bead in the ware extending in a generally radial direction. It seems to result from an unduly long travel of slip around the mold cavity in a generally circular direction from the point of pouring and forms where the oppositely traveling streams of such slip meet each other within the mold cavity. The slow-fast fill, the filling under pressure and the use of two diametrically opposite filling points jointly and severally cure this defect. I have further discovered that the slow-fast filling of the mold cavity has an additional advantage in that off-color spots are prevented or eliminated. Such a spot not infrequently occurs as a surface blemish when my invention is departed from due to a lightening in color or a decolorization action. While the precise cause of this spot is obscure the slow-fast fill overcomes it.

In some cases also I have found it to be desirable to cast particular articles upside-down. In carrying out this modification of the invention the molds of Figs. 1 and 4, for example, are inverted and a hole provided extending up through the lower mold into which the end of a hole, nozzle or the like is inserted so that filling takes place from below under pressure but also in the thick-thin direction as above explained. In such case I omit the funnel and all its accoutrements and, of course, the pressure is continued or other suitable means provided for preventing the slip from running out until the casting has been formed. This procedure would preferably be carried out on a bench and is semi-automatic in its nature.

Within the terms of the appended claims, other additions, omissions, substitutions, and alterations may be made without departing from the principles or scope of the present invention. In connection with some articles pouring may occur at two points and while this produces two pour spots the filling operation is speeded up and perfect filling always results regardless of size, shape, contour, etc. of the article. It is also within the scope of the invention to pour at or adjacent the thickest and thinnest portions of the mold cavity. Rather the invention is to be defined by the appended claims.

Having thus described my invention, what I claim as new and desire to secure by Letters Patent is:

1. A method of casting ceramic flatware which comprises introducing a charge of liquid slip of suitable composition, specific gravity and viscosity into a closed mold cavity of non-uniform thickness adjacent the thickest portion thereof to fill the mold, causing such charge of slip to flow in a thick-thin direction and to take the form of a ceramic flatware article, withdrawing moisture from the charge of slip while maintaining its form to produce a well-defined casting, converting the casting to a condition of leather-like hardness and then suitably finishing the casting as required, said charge introduction being initiated at a relatively slow rate and completed at a relatively faster rate.

2. A method of casting relatively thin ceramic flatware of non-uniform thickness which comprises the steps of introducing liquid slip of suitable composition into a closed mold cavity having the same shape as the flatware to be produced and at the thickest portion of such cavity, extracting moisture from such liquid slip to produce a casting of increased density as compared with the liquid slip, imparting to this casting sufficient strength to enable it to be handled and firing the casting to produce cast flatware therefrom, the said liquid slip being poured through a non-porous funnel and the amount of liquid slip introduced being so controlled as to constitute a volume sufficiently in excess of the volume of the mold cavity to allow for shrinkage occurring during the formation of the casting while moisture extraction is proceeding, said slip introduction being initiated at a relatively slow rate and completed at a relatively faster rate.

3. In a method of producing thin ceramic flatware by slip-casting the same in a closed mold cavity of non-uniform thickness characteristics, the steps which comprise introducing liquid slip into such mold cavity adjacent the thickest portion thereof in such manner that the initial portion of such slip is introduced relatively slowly and the mold cavity is thereafter filled at a rate faster than the rate at which such initial slip portion is supplied.

4. In a method of producing a thin ceramic flatware article by slip-casting the same in a porous mold provided with a closed mold cavity of non-uniform thickness in which the thickest portions communicate with the thinner portions by portions of equal or diminishing thickness, the steps which comprise introducing liquid slip into such mold cavity adjacent the thickest portion thereof in such manner as to effect filling and casting in a thick-thin direction, the slip being introduced into the mold cavity at a relatively slow rate as to the initial portion thereof, at a faster rate thereafter until the mold cavity is completely filled and finally supplying additional slip to said cavity to compensate for the absorption of water by said porous mold at the rate at which said porous mold absorbs the water from said slip to complete the article.

5. In a method of producing a thin ceramic flatware article by slip-casting the same in a porous mold provided with a closed mold cavity of non-uniform thickness in which the thickest portions communicate with the thinner portions by portions of equal or diminishing thickness, the steps which compirse introducing liquid slip into such mold cavity adjacent the thickest portion thereof in such manner as to effect filling and casting in a thick-thin direction, the slip being introduced into the mold cavity at a relatively slow rate as to the initial portion thereof, at a faster rate thereafter until the mold cavity is completely filled and finally supplying additional slip to said cavity to compensate for the absorption of water by said porous mold at the rate at which said porous mold absorbs the water from said slip to complete the article, that part of the filling of the mold cavity which is carried out at the faster rate being effected at super-atmospheric pressure which is subsequently relieved so that the supply of additional slip occurs at substantially normal atmospheric pressure.

6. A method of slip-casting an article of ceramic flatware, in which liquid slip is fed to a closed mold cavity formed in a porous mold, which comprises initially delivering liquid slip into such mold cavity at a relatively slow rate, thereafter filling the mold cavity at a faster rate and preventing the entrapment of air in the slip which is being delivered at such faster rate.

7. A method of slip-casting an article of ceramic flatware, in which liquid slip is introduced into a closed mold cavity formed in a porous mold, which comprises initially delivering liquid slip into such mold cavity at a relatively slow rate in an amount insufficient to fill such cavity but sufficient to provide a liquid seal at the point of introduction, thereafter filling the mold cavity at a faster rate and under such conditions that the slip supplied at the faster rate is delivered out of contact with the outside atmosphere and beneath the surface of the liquid seal formed by the slip fed at the slower rate, the slip which is supplied at the faster rate being introduced into the mold cavity under super-atmospheric pressure conditions.

8. A method of slip-casting a relatively flat and thin ceramic article, such as a plate or saucer which has a central disc-like portion, a surrounding foot and an outwardly tapering rim portion and in which said foot constitutes the thickest portion of such article, which comprises introducing liquid slip into a closed mold cavity which, with due allowance for shrinkage, has the size and shape of such article and controlling the introduction of such slip into said mold cavity in such manner that the slip is fed into that portion of the mold cavity which corresponds to an eccentric point in said central portion but adjacent said foot initially at a relatively slow rate for a portion of such filling operation and thereafter completing the filling of the mold cavity at a faster rate and finally supplying additional slip to said mold cavity to compensate for the absorption of water by said porous mold at the rate at which said porous mold absorbs the water from said slip to comtplete the article.

9. A method of slip-casting a relatively flat and thin ceramic article, such as a plate or saucer which has a central disc-like portion, a sourrounding foot and an outwardly tapering rim portion and in which said foot constitutes the thickest portion of such article, which comprises introducing liquid slip into a closed mold cavity which, with due allowance for shrinkage, has the size and shape of such article and controlling the introduction of such slip into said mold cavity in such manner that the slip is fed into that portion of the mold cavity which corresponds to an eccentric point in said central portion but adjacent said foot initially at a relatively slow rate for a portion of such filling operation and thereafter completing the filling of the mold cavity at a faster rate and finally supplying additional slip to said mold cavity to compensate for the absorption of water by said porous mold at the rate at which said porous mold absorbs the water from said slip to complete the article, that portion of the filling of the mold cavity which is carried out at the faster rate being effected at super-atmospheric pressure which is subsequently relieved so that the supply of additional slip occurs at substantially normal atmospheric pressure.

JAMES A. BOWER.